M. SCHITZKOWSKY.
METHOD OF FORMING COLLARS ON METAL PIPES.
APPLICATION FILED APR. 3, 1912.

1,050,175.

Patented Jan. 14, 1913.

2 SHEETS—SHEET 1.

Witnesses:
B. 2. Bridges

Inventor:
Moritz Schitzkowsky
By Davis & Davis
Attorneys

M. SCHITZKOWSKY.
METHOD OF FORMING COLLARS ON METAL PIPES.
APPLICATION FILED APR. 3, 1912.

1,050,175.

Patented Jan. 14, 1913.
2 SHEETS—SHEET 2.

UNITED STATES PATENT OFFICE.

MORITZ SCHITZKOWSKY, OF DUSSELDORF, GERMANY.

METHOD OF FORMING COLLARS ON METAL PIPES.

1,050,175.  Specification of Letters Patent.  Patented Jan. 14, 1913.

Application filed April 3, 1912. Serial No. 688,197.

*To all whom it may concern:*

Be it known that I, MORITZ SCHITZKOWSKY, working manager, a citizen of the German Empire, residing at Dusseldorf, Germany, have invented certain new and useful Improvements in Methods of Forming Collars on Metal Pipes, of which the following is a specification.

This invention has for its object to make collars or other thickened portions on hollow bodies, more particularly on pipes, out of the material of the hollow body itself, and thus to insure a reliable connection thereto.

In the processes hitherto known, the thickened portion formed from separate pieces of material is generally welded on the end of the hollow body by hammering or compression, after heating both the end of the hollow body and the thickening material to welding temperature. In that case, the heating frequently weakens the comparatively thin wall of the pipe, and in view of the different natures of the material used for thickening, and that of the pipe, the welding is frequently not good and complete, so that when exposed to strains, the pipe frequently breaks at the weakened wall, or the thickening material becomes detached, which, in piping or other apparatus for high pressure, is liable to produce considerable disturbances or accidents.

Figure 1:
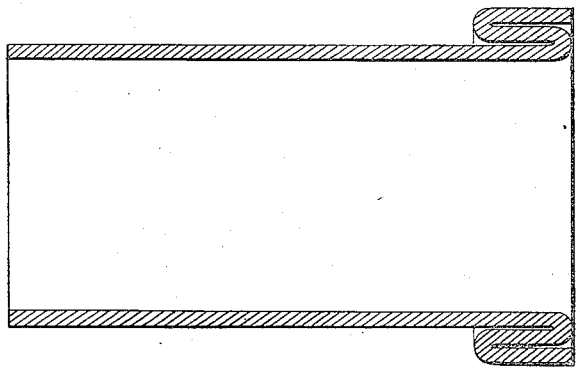
Figure 3:
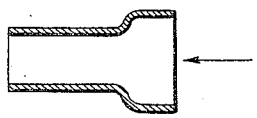
Figure 2:
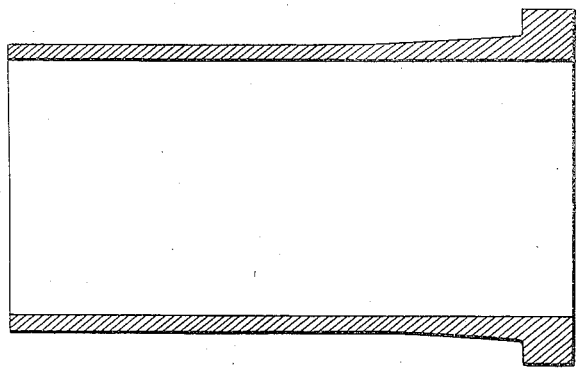
Figure 4:
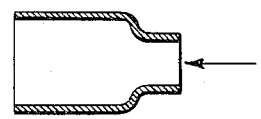
Figure 5:
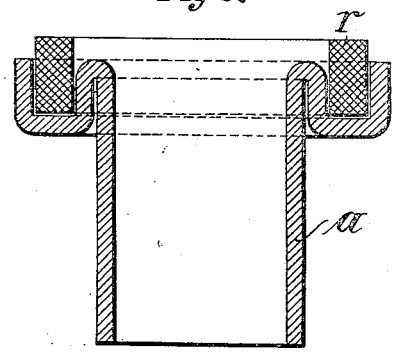
Figure 7:
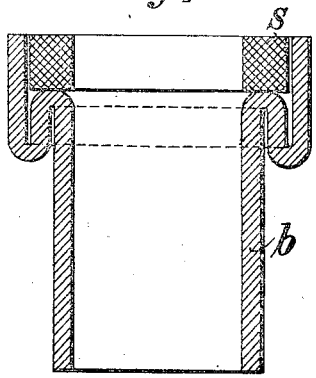
Figure 6:
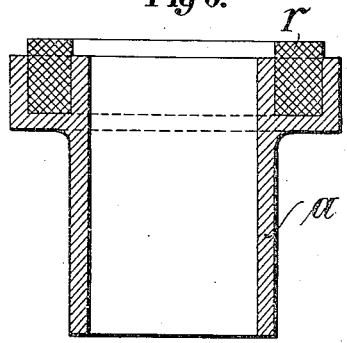
Figure 8:
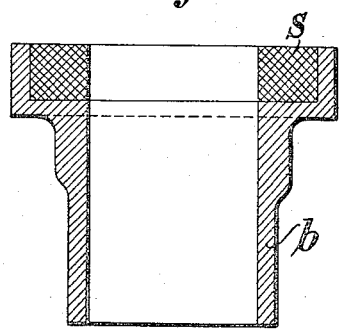
Figure 9:
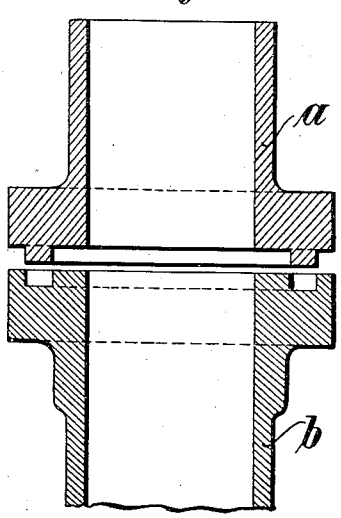
Figure 10:
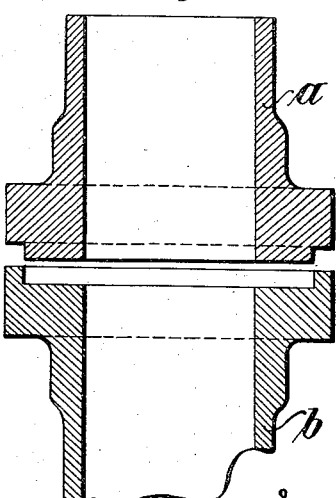

In the drawings annexed, Figure 1 is a longitudinal section of a metal pipe showing the body of the pipe folded upon itself preparatory to welding; Fig. 2 is a similar view showing the collar completely formed by welding; Fig. 3 a similar view reduced, showing the first step in the folding of the metal; Fig. 4 a similar view showing a slight modification of the first step in the process; Fig. 5 a similar view showing the manner of embodying in the collar a separate ring of metal; Fig. 6 a similar view showing the completed collar with the ring embedded therein; Figs. 7 and 8 views similar to Figs. 5 and 6 respectively illustrating another manner of embodying a ring of separate metal in the collar; Figs. 9 and 10 longitudinal sections of adjoining collars made according to the processes illustrated by Figs. 5 to 8 inclusive.

In the process according to this invention, the material of the tube itself is used for thickening, the wall of the same being pulled or turned in several layers over the end, in the manner shown in Fig. 1, and the thickened portion thus produced being then welded, after heating, by hammering or compression, that is to say, compressed into the desired final shape of the thickened portion, for instance that shown in Fig. 2. In this process, the wall of the hollow body does not suffer, and the connection is an absolutely reliable one.

In the example illustrated in Fig. 1, the wall of the tube, for the purpose of forming a collar, is turned over outward in three layers. If desired, this could also be done in such a way that the thickening layers lie in the interior of the hollow body in question.

In the first case, before turning over, the end of the pipe is widened, as shown in Fig. 3, and in the latter case it is reduced, as shown in Fig. 4.

The process could also be carried out in such a way that, after the first stage of the process, an intermediate ring of welding iron, soft steel or cast material, is introduced, whereupon the thickened portion with the said intermediate ring is brought to the welding heat, in order to weld it into one piece of the desired final shape, by compression or hammering. In certain cases, the compression into the final shape can also be effected in the cold state. This method of carrying out the process, with the use of a separate intermediate ring, has the object and advantage that when machining thickened portions or collars, for instance when the pipe flange is turned at the joint, it is possible to avoid touching during that treatment the main core of the collar, which consists of the same material as the pipe; on the contrary, only the intermediate ring of material more suitable for the purpose in question, is touched during the treatment. Two methods of carrying out this process are shown in Figs. 5-8.

In the construction shown in Figs. 5 and 6, during the pulling in or turning in of the pipe end, an intermediate ring $r$ of a suitable material, other than that of the pipe, is inserted into an intermediate space of the turned over end, provided for it, as shown in Fig. 5, and then combined by compression or hammering into the shape shown in Fig. 6, so that the end of the intermediate ring of different material does not lie flush with the collar of the tube, but projects from the same in an annular shape.

In the construction shown in Figs. 7 and 8, the space for receiving the intermediate ring s is provided in front of the double curvature of the thickened portion obtained by turning over, as shown in Fig. 7, so that after the connection by compression or hammering, the front edge of the intermediate ring is flush with the front edge of the pipe collar.

Figs. 9 and 10 show the use in pipes where, for the purpose of fitting collars or flanges into each other, the said flanges are to be recessed by turning. According as this turning is effected only at the circumference or also at the inside, pipes are used which are made by the process according to Figs. 5 and 6, or to Figs. 7 and 8. If the turning is to be done also in the interior, a pipe a is used where, according to Fig. 6, the intermediate ring projects in an annular shape beyond the end of the pipe collar. For the counter pipe, or the pipe recessed only at the outside, as shown in Fig. 10, are used on the contrary pipes b shown in Fig. 8 in which the intermediate ring is flush with the pipe collar. It will be seen that in any case, the treatment touches only this intermediate ring of a material different from the pipe material and more suitable for the treatment, but not the core of the thickened portion or collar which, according to the process, consists of the same material as the pipe.

Having now particularly described and ascertained the nature of my said invention and in what manner the same is to be performed, I declare that what I claim is:—

1. The method herein described of forming collars on the ends of pipes, consisting in folding back upon the body of the pipe the end portion of the wall of the pipe, the metal being folded back and forth upon itself to form an annular multi-pli flange, and then reducing the thickened portion thus produced to its final shape by welding action.

2. The method herein described of forming collars on the ends of pipes, consisting in folding back upon the body of the pipe the end portion of the wall of the pipe, the metal being folded back and forth upon itself to form an annular multi-pli flange, then introducing within the folded parts thus produced a ring of metal differing in character from the metal of the pipe, and then reducing the collar thus formed to its final shape by welding, said ring being incorporated in the collar by said welding action.

In testimony whereof I hereunto affix my signature in presence of two witnesses.

MORITZ SCHITZKOWSKY.

Witnesses:
O. SALIRG,
M. BAERENS.